United States Patent
Leraut et al.

(10) Patent No.: US 9,941,913 B2
(45) Date of Patent: Apr. 10, 2018

(54) FILTERING DEVICE FOR A PMR PORTABLE MOBILE TERMINAL, AND MOBILE TERMINAL

(71) Applicant: AIRBUS DS SAS, Elancourt (FR)

(72) Inventors: Christophe Leraut, Montigny le Bretonneux (FR); Frédéric Fraysse, Saint-Cyr l'Ecole (FR); Eric Georgeaux, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 15/110,507

(22) PCT Filed: Dec. 15, 2014

(86) PCT No.: PCT/FR2014/000279
§ 371 (c)(1),
(2) Date: Jul. 8, 2016

(87) PCT Pub. No.: WO2015/104463
PCT Pub. Date: Jul. 16, 2015

(65) Prior Publication Data
US 2016/0336982 A1 Nov. 17, 2016

(30) Foreign Application Priority Data
Jan. 9, 2014 (FR) ...................................... 14 50154

(51) Int. Cl.
*H04B 1/00* (2006.01)
*H04B 1/10* (2006.01)
(Continued)

(52) U.S. Cl.
CPC .......... *H04B 1/1018* (2013.01); *H04B 1/088* (2013.01); *H04B 1/12* (2013.01); *H04B 1/3833* (2013.01); *H04W 56/0015* (2013.01); *H04B 1/10* (2013.01)

(58) Field of Classification Search
CPC . H04W 56/0015; H04B 1/088; H04B 1/1018; H04B 1/12; H04B 1/3833; H04B 1/10
See application file for complete search history.

(56) References Cited

U.S. PATENT DOCUMENTS 5,729,829 A 3/1998 Talwar et al.
5,937,341 A * 8/1999 Suominen .............. H03D 3/007
375/324

(Continued)

FOREIGN PATENT DOCUMENTS

EP 2 536 031 A1 12/2012
FR 2 979 045 A1 2/2013

OTHER PUBLICATIONS

International Search Report as issued in International Patent Application No. PCT/FR2014/000279, dated Mar. 30, 2015.

*Primary Examiner* — Ping Hsieh
(74) *Attorney, Agent, or Firm* — Pillsbury Winthrop Shaw Pittman LLP

(57) ABSTRACT

A filtering device intended for being connected to a portable mobile terminal compatible with a PMR network having a wide range of receiving frequencies $B_i$, includes a fastening system for fastening to the mobile terminal, a first radio-frequency connector intended for engaging with a radio-frequency connector of the mobile terminal, a first channel including a first filter for filtering a first receiving useful band $B_{ui}$ included within the band $B_i$, and a second radio-
(Continued)

frequency connector intended for engaging with a removable RF antenna to transmit or receive radio-frequency signals.

15 Claims, 4 Drawing Sheets

(51) Int. Cl.
    *H04B 1/08*     (2006.01)
    *H04B 1/3827*   (2015.01)
    *H04B 1/12*     (2006.01)
    *H04W 56/00*   (2009.01)

(56) References Cited

U.S. PATENT DOCUMENTS

| | | | |
|---|---|---|---|
| 6,469,590 B1 | 10/2002 | Lewis, Jr. et al. | |
| 2009/0011736 A1* | 1/2009 | Malasani | H04B 1/18 455/307 |
| 2011/0299431 A1* | 12/2011 | Mikhemar | H04B 1/18 370/277 |

* cited by examiner

FILTERING DEVICE FOR A PMR PORTABLE MOBILE TERMINAL, AND MOBILE TERMINAL

CROSS-REFERENCE TO RELATED APPLICATIONS

This application is the U.S. National Stage of PCT/FR2014/000279, filed Dec. 15, 2014, which in turn claims priority to French Patent Application No. 14 50154 filed Jan. 9, 2014, the entire contents of all applications are incorporated herein by reference in their entireties.

TECHNICAL DOMAIN

The field of the invention relates to portable mobile terminals compatible with a PMR network and means of improving the quality of narrow band (NB) transmissions, particularly for voice transmission. More precisely, the domain of the invention relates to means of making a PMR portable mobile terminal immune to interference from broad band (BB) communications, for high speed data transmission when these bands are close to narrow band communications on a PMR network.

STATE OF PRIOR ART

PMR (Private Mobile Radiocommunications) networks exist at the present time. These networks are used in different applications depending on the tuned frequency bands and the mobile terminals used. They are dedicated principally to voice transmissions but may also concern low speed data transmissions.

A special feature of terminals deployed on a PMR network is that they are generally compatible with a wide range of frequencies, generally much wider than width of channels used to set up communications. The channels used define bands called "narrow bands".

The Narrow Band is called the NB band. It corresponds to a narrow pass band corresponding to the pass band of the signal carrying the data to be transmitted or received. It does not go outside the channel coherence band. For example in telephony, a narrow band can be defined to transport voice in the 300 to 3400 Hz band, for example in 12.5 kHz wide channels.

One of the problems encountered at the present time in PMR terminals and their broad compatibility is that signals in the NB band are disturbed by "wide band" signals close to an NB band or covering an NB band.

The Broadband (BB) is a band containing many frequencies for use for high speed data transmission, particularly for the transport of different signals or carriers in said band. For example, a BB band may correspond to a video broadcasting band. A BB band is usually intended for 3G or 4G applications.

A major problem with terminals deployed before the normalisation of BB bands and the deployment of high speed data networks is that they are not currently immunised against disturbances caused by transmissions in BB bands close to or partially overlapping existing NB bands.

Disturbances of communications in the NB band of PMR terminals include phenomena of interference and intermodulation between signals in the two bands.

At the present time, one solution recommended when a communication on a PMR terminal is disturbed in an NB band by transmissions in BB bands, is to physically move the BB transceiver to a distance from the PMR terminal. This solution illustrates a limitation for the user in the use of PMR terminals. Furthermore, the two NB and BB networks are likely to be collocated on the user and to be used simultaneously by the user.

There are BB band filter devices for NB communications so as to reduce interference caused by transmissions in the BB band, but these solutions require additional large equipment, a connection to the NB transceiver, a local antenna and a dedicated power supply that can be envisaged for a mobile terminal in a vehicle but not for a PMR portable mobile terminal.

PRESENTATION OF THE INVENTION

The invention aims to overcome the above-mentioned disadvantages.

One purpose of the invention relates to a filter device designed to be connected to a portable mobile terminal compatible with a PMR network with a wide frequency band in reception $B_1$, characterised in that it comprises means of attachment to said mobile terminal, a first radiofrequency connector that will cooperate with a radiofrequency connector on the mobile terminal, a first channel comprising a first filter to reduce interference in a first useful band $B_{u1}$, at least in reception in band $B_1$, and a second radiofrequency connector that will cooperate with a removable RF antenna to transmit or receive radiofrequency signals.

One advantage is that a compact and easily installed solution is obtained, Reuse of the mobile antenna, use of the accessory connector and attachment of the filter device to a mobile terminal is simplified by the invention. The mobile terminal is made almost insensitive to disturbances caused by data transmissions in broad bands close to the NB band used.

Advantageously, the filter device comprises a second channel comprising a second filter for reducing interference in a second band $B_{u2}$ in reception or in transmission in band $B_1$.

The second radiofrequency connector is advantageously identical to the radiofrequency connector to which the removable antenna of said mobile terminal is connected to facilitate compatibility of antenna attachments with the two equipment units. Therefore the same antenna can be used depending on the use, when it is connected to the terminal or to the filter device.

Advantageously, the first filter and/or the second filter is a passband filter for which the template is adapted to one of the useful bands $B_{u1}$ or $B_{u2}$.

Advantageously, the first filter and/or the second filter is a band-stop filter for which the template is adapted to one of the useful bands $B_{u1}$ or $B_{u2}$.

Advantageously, the filter device comprises a control interface intended to cooperate with a connector of the mobile terminal, the control interface outputting a synchronisation data to activate a set of switches to trigger the changeover from the first channel to the second channel and vice versa.

Advantageously, the second channel is used to transmit RF signals from the first radiofrequency connector, selection of each filter device channel being controlled by the set of switches, the switches being synchronised by means of the synchronisation signal originating from the control interface.

In one embodiment, the second channel will include a frequency isolator to isolate the second channel from intermodulation products between transmitted amplified signals and signals received by the filter device.

Advantageously, each channel is used to transmit and receive RF signals from or to the mobile terminal, the active channel in transmission and reception being selected by the synchronisation signal from the control interface.

Advantageously, the filter device comprises a power supply interface with the mobile terminal to receive a power supply signal that supplies power to at least one component of said filter device.

Advantageously, power supply interface and control interface signals are routed through the same connector of the filter device.

Advantageously, the filter device comprises a third channel for reception of a GPS signal through the antenna.

Another purpose of the invention relates to a mobile terminal comprising at least two RF connectors, of which a first connector fixes an RF antenna to be compatible with a PMR network with a broad frequency band in reception $B_1$ and a second connector cooperating with a connector of a filter device according to the invention.

Advantageously, the mobile terminal comprises a first mode called "relay mode", the relay mode defining a first useful band $B_{u1}$ for reception of signals and a second useful band $B_{u2}$ for transmission of signals in band $B_1$, each useful band $B_{u1}$ and $B_{u2}$ being assigned to one of the two channels of the filter device, the mobile terminal sending a synchronisation signal to the first and the second switches so as to select the channel corresponding to the current transmission or reception in real time.

Advantageously, the mobile terminal comprises a second mode called "direct mode", the direct mode defining a third useful band $B_{u3}$ for transmission and reception of RF signals, the third useful band $B_{u3}$ being assigned to one of the two channels of the filter device, the mobile terminal sending a synchronisation signal to the first and second switches so as to select the corresponding channel to set up the communication.

Advantageously, the mobile terminal comprises an accessory connector to output a power supply signal to the filter device and/or a synchronisation signal.

Advantageously, such a filter device may be designed at the same time as a PMR mobile terminal is designed to obtain optimised ergonomics when said filter device is fixed to the terminal.

BRIEF DESCRIPTION OF THE FIGURES

Other characteristics and advantages of the invention will become clear after reading the detailed description given below with reference to the appended figures that illustrate.

DESCRIPTION

The terms "frequency range" and "frequency band" are used indifferently in the description of this invention.

In this invention, a frequency band corresponding to an application of a PMR network is called band $B_1$. It may for example be the 174-230 MHz band called the 200 MHz band or the [380-399.9 MHz], [406.1-430 MHz] and [440-470 MHz] bands called the 400 MHz bands. There is a plurality of frequency bands corresponding to different applications of a PMR network. Band $B_1$ in this invention is a band within a wide band between 29 MHz and 1 GHz, Depending on the configurations and applications of a PMR network, a BB band and an NB band can be included within the same band $B_1$. The filter device according of the invention can efficiently filter signals in the BB band that might interfere with signals in the NB band.

More particularly, the NB band might correspond to a band dedicated to voice in a PMR network that is a radio communications private mobile network. The NB band may also denote bands to set up GSM or GPRS communications.

Figure 1A:
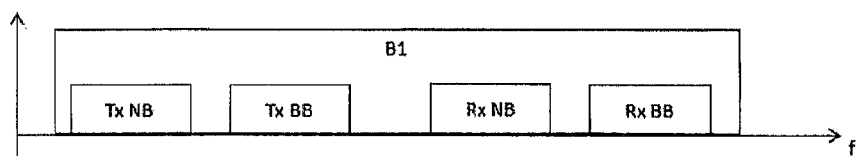
FIGS. 1A, 1B and 1C: different implementations of the NB and BB bands corresponding to different applications of a PMR network jointly with a high speed data network.
Figure 1B:
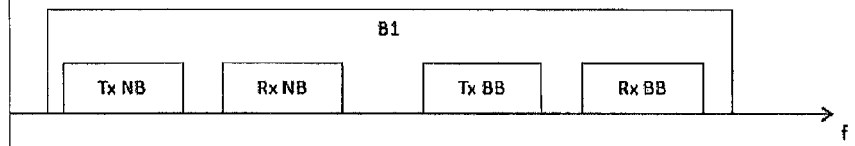
Figure 1C:
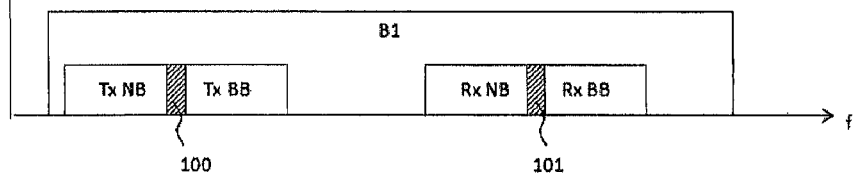

FIGS. 1A to 1C show different cases representing NB and BB bands in reception (Rx NB and Rx BB) and in transmission (Tx NB and Tx BB) in band B1.

According to another implementation shown in FIG. 1A, the NB and BB bands are interlaced in the sense that the two Tx NB and Tx BB bands dedicated to data transmission Tx are close to each other and the same applies for the two bands in reception (Rx NB and Rx BB).

According to an implementation shown in FIG. 1B, the NB ad BB bands are adjacent in the sense that the two Tx NB and Rx NB bands dedicated to data transmission and reception in the NB band are close to the two bands Tx BB and Rx BB.

According to another implementation shown in FIG. 1C, it is possible that the NB and BB bands overlap on ranges 100 at the ends of each band in a configuration of interlaced bands like those shown in FIG. 1A.

Therefore the purpose of this invention is to make a mobile terminal designed for the NB network dedicated to the PMR network immune from signals transmitted in the BB band. One purpose of this invention is to reduce the sensitivity of signals received n the NB band to interfering signals from a nearby BB band and intermodulation products between signals in the NB band and the BB band.

Figure 2:
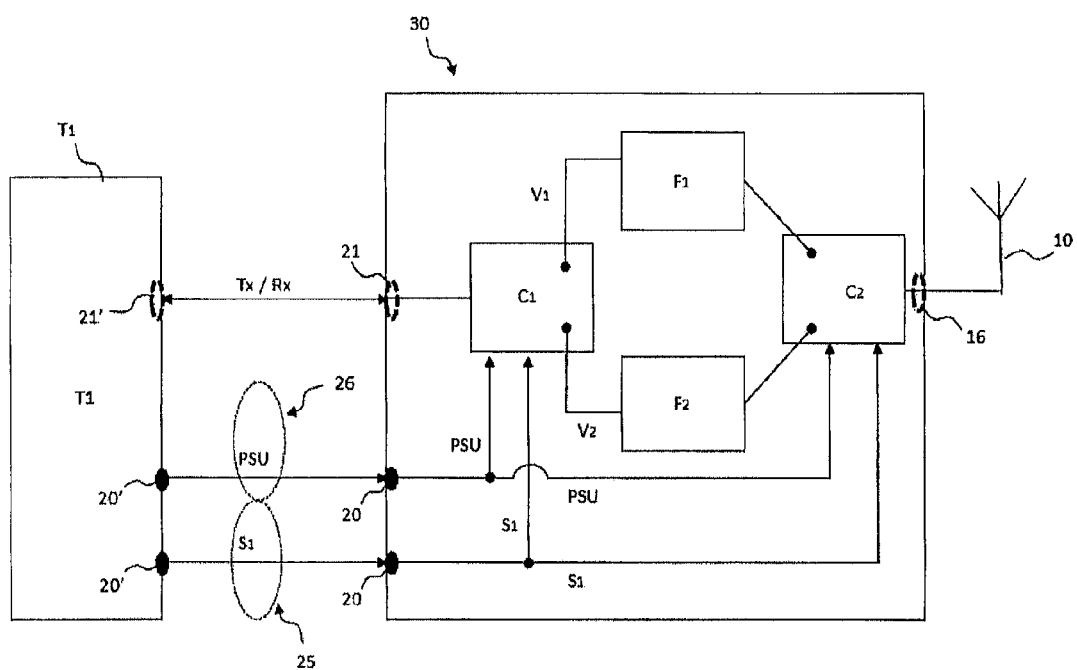
FIG. 2: a diagram of interfaces between the filter device according to the invention and a mobile terminal compatible with a PMR network.

FIG. 2 shows one embodiment of the invention in which the interfaces between a mobile terminal $T_1$ of a PMR network and a filter device 30 are shown.

The filter device 30 according to the invention includes a radiofrequency Tx/Rx interface for the reception and transmission of RF signals to or from the mobile terminal $T_1$. The filter device 30 according to the invention comprises an RF connector 21 for this purpose that will cooperate with a connector 21' of a mobile terminal $T_1$.

According to one embodiment, RF signals may either be switched to a first channel $V_1$ or to a second channel $V_2$ of the filter device 30. A set of switches C1, C2 does the switching.

According to a first communication mode called "relay mode", each channel $V_1$, $V_2$ of the filter device 30 is associated with one channel in transmission $V_2$ and one channel in reception $V_1$. Signals are received for example on channel $V_1$ in a first useful band denoted $B_{u1}$ and signals are then transmitted on channel $V_2$ in a second useful band $B_{u2}$.

The first channel $V_1$ for reception of signals in band $B_{u1}$ comprises at least one filter $F_1$ to improve the reception of frequencies received in band $B_1$.

According to one embodiment, the filter $F_1$ may be a passband filter centred for example around the useful band $B_{u1}$.

According to another embodiment, the filter $F_1$ may be a band-stop filter of a BB band close to band $B_{u1}$.

The first channel $V_1$ may also include a combination of filters $F_1$ like those mentioned above, namely a passband filter and a band-stop filter. The signals thus filtered are transferred to the terminal through the Tx/Rx interface by means of connectors 21' and 21. When the connectors 21' and 21 are connected to each other, they make the Tx/Rx interface to transmit signals from the filter device 30 to the mobile terminal $T_1$ and vice versa.

In this first communication mode, the second channel $V_2$ is used to transmit signals in a useful band $B_{u2}$. The transmitted signals originate from the mobile terminal $T_1$ and are routed through the Tx/Rx interface between connectors 21' and 21.

According to one embodiment, this second channel $V_2$ can include an isolator not shown on the figures so as to reduce intermodulation products produced by the amplifier of terminal $T_1$ in the useful band $B_{u1}$ thus disturbing transmission of signals in the first reception channel $V_1$.

In order to change from a reception mode to a transmission mode, the RF signals to be transmitted originating from the mobile terminal $T_1$ are switched to channel $V_2$ by means of a switch $C_1$ among the set of switches $C_1$, $C_2$ of the filter device 30.

A first switch $C_1$ is formed at the input to channels $V_1$ and $V_2$ and is associated with at least one second switch $C_2$ at the output from the filter device 30 so as to route channel $V_2$ that has become active to the antenna 10 connected to the filter device 30.

The input to channels $V_1$ and $V_2$ is defined as the part of the channels close to the RF connectors 21 and the output from channels $V_1$ and $V_2$ is defined as the part of the channels located close to the antenna 10.

The antenna 10 is used for reception and transmission of RF signals. It is preferably identical to the antenna initially designed for the mobile terminal $T_1$. Therefore it is adapted to reception and transmission of signals in a broad band $B_1$.

The switch $C_1$ is controlled by means of a synchronisation signal $S_1$ output from terminal $T_1$. Consequently, according to one embodiment of the invention, the switch $C_2$ at the output from channels $V_1$ and $V_2$ is synchronised on the same synchronisation signal $S_1$ as switch $C_1$.

The filter device 30 comprises a control interface for this purpose. The control interface 25 is produced firstly by means of a connector 20 of the filter device 30 designed to cooperated with a connector 20' of the mobile terminal $T_1$. The control interface 25 routes a synchronisation signal $S_1$ generated by the terminal $T_1$ to switches $C_1$, $C_2$ of the filter device 30. The synchronisation signal $S_1$ may for example be a signal generated by a computer in the mobile terminal $T_1$. The filter device 30 can switch in real time between the transmission channel $V_2$ and the reception channel $V_1$ so as to continue communication between at least two terminals comprising different alternations of transmission and reception of RF signals.

The two switches $C_1$ and $C_2$ switch synchronously due to the synchronisation signal $S_1$ that is routed to each switch. If a plurality of switches is used, the synchronisation signal $S_1$ is routed to each additional switch implemented in channels $V_1$, $V_2$.

In this first communication mode, the filter device 30 filters signals received in channel $V_1$ by means of a filter $F_1$ and routes the filtered signals to the mobile terminal $T_1$. The filter device 30 according to the invention can limit disturbances related to interference between signals then demodulated in base band in the mobile terminal $T_1$.

In one embodiment, channel $V_1$ in reception may include an amplifier so as to amplify received signals before or after the filter $F_1$.

According to one embodiment of the filter device 30, this device comprises a power supply interface 26. Advantageously, the power supply interface 26 can be distributed through the same connector 20 in the filter device 30. In this case, the connector 20 includes an input to receive a power supply signal PSU from the mobile terminal $T_1$. The power supply signal PSU is then routed to the connector 20 using one of the inputs/outputs of the connector 20'. For example, the power supply signal PSU may be a signal output from a battery connector of the mobile terminal $T_1$. In another embodiment, the power supply interface 26 is made by means of dedicated connectors between the filter device 30 and the mobile terminal $T_1$. In the case described and represented on FIGS. 2 to 4, the connector 20 making the power supply interface and the control interface is the same as and is identical to the connector 20' of the mobile terminal $T_1$.

The power supply interface 26 routes a power supply signal PSU that preferably already exists in the mobile terminal $T_1$.

The filter device 30 includes internal connections to route the power supply signal PSU to all active components that require a power supply, and particularly switches $C_1$, $C_2$.

One advantage of using the same connector 20 to combine the control interface 25 and the power supply interface 26 is that this minimises developments of the filter device 30.

In a second communication mode called "direct mode", the channels $V_1$ and $V_2$ are not specifically assigned to data reception or transmission.

In direct mode, each channel $V_1$ and $V_2$ is capable of transmitting and receiving signals from or to the antenna 10. Each channel $V_1$ and $V_2$ has its own useful band. If $V_1$ includes a first useful band, for example $B_{u1}$ the useful band of the second channel $V_2$ can be denoted $B_{u3}$. Let $B_H$ be the higher band and $B_L$ the lower band, each of the bands being assigned to one of the channels $V_1$, $V_2$. Each of these useful bands has common frequencies in band B1 for transmission and reception of data for a channel.

This communication mode may for example be compatible with "Push to talk" or "Push to transmit" communications. These communications may be compatible with transmission and reception on the same channel by means of a connection to determine if the channel is in transmission or reception. The channel $V_1$ or $V_2$ used may be determined at the beginning of the communication by sending a synchronisation signal from the mobile terminal to the filter device 30. The synchronisation signal $S_1$ then selects the appropriate channel $V_1$ or $V_2$ to set up the half duplex communication.

Depending on the planned communication mode (direct or relayed) and the status of communications among "no communication", "transmission", "reception", the filter device 30 is capable of outputting a power supply signal PSU adapted to the required power supply for each component power supply. The mobile terminal $T_1$ controls the power supply signal PSU and its level as a function of the communication mode and status of the terminal. For example, power supply signal levels that can be used in the invention correspond to 3.3 V or 1.8 V power supplies.

Figure 3:
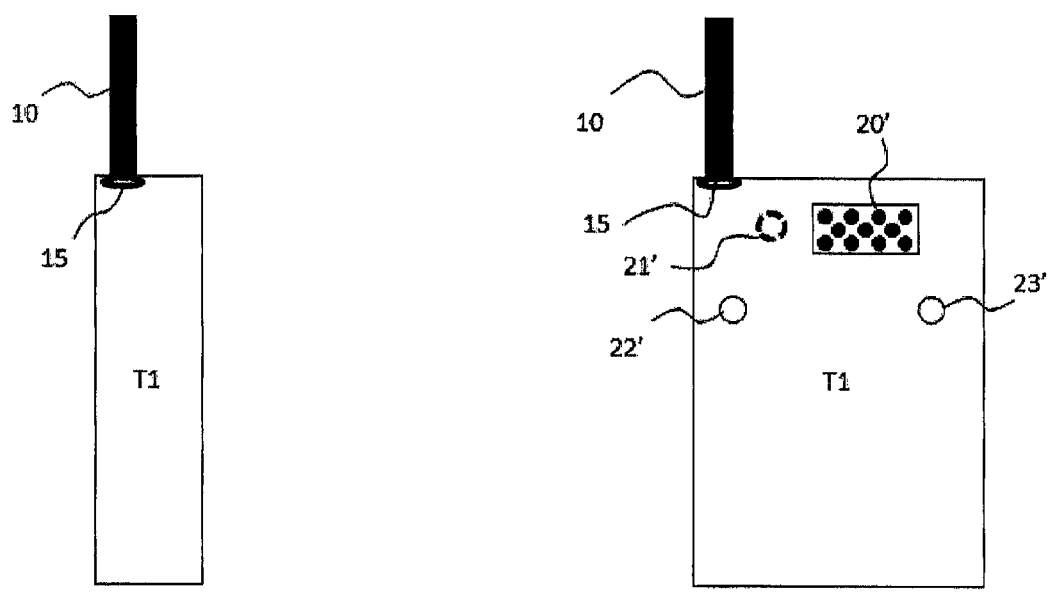
FIG. 3: a mobile terminal adapted to a PMR network comprising interfaces to be associated with a filter device according to the invention.

FIG. 3 shows a PMR mobile terminal $T_1$ that is adapted to cooperate with a filter device 30 according to the invention. The mobile terminal $T_1$ comprises an antenna 10 and an RF connector 15 used to fix and to remove the removable antenna 10. The terminal $T_1$ is adapted to cooperate with a filter device 30 in that it comprises a second RF connector 21' preferably located on the back part of the frame of the mobile terminal $T_1$. This back part of the frame of the mobile terminal that forms the back of the terminal also comprises attachment means 22', 23' used to fix a filter device 30 according to the invention to the back of the mobile terminal $T_1$. FIG. 3 also shows a connector 20' at the back of the mobile terminal $T_1$ comprising a plurality of inputs/outputs including particularly the power supply interface 26 and the control interface 25 that route power supply PSU and synchronisation $S_1$ signals to the filter device 30.

Figure 4:
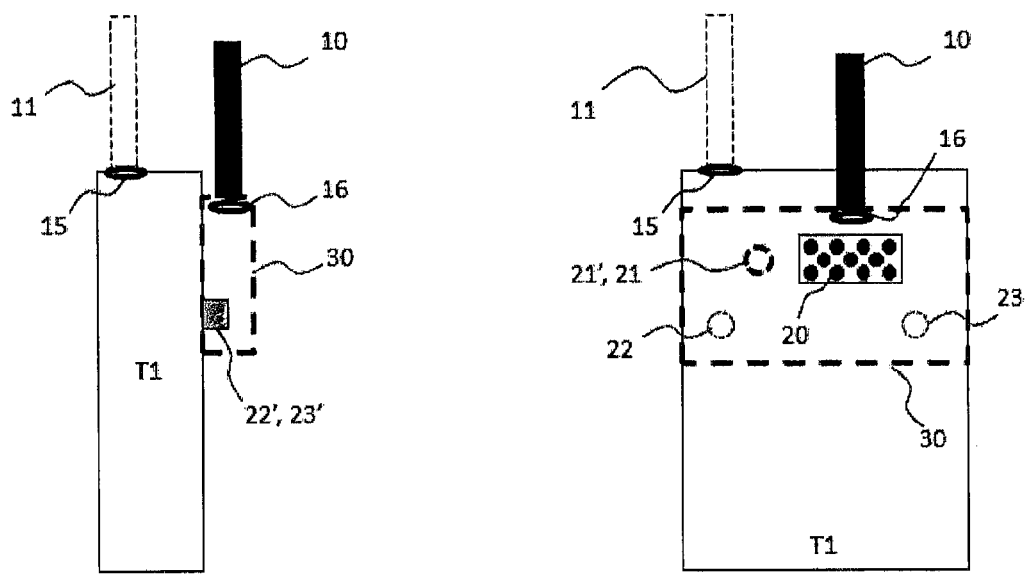
FIG. 4: a mobile terminal according to the invention adapted to a PMR network comprising a filter device according to the invention.

FIG. 4 shows a mobile terminal $T_1$ to which a filter device 30 according to the invention is fixed by attachment means 22 and 23 compatible with means 22' and 23' of the mobile terminal $T_1$.

The connector 20 on the filter device 30 is adapted to cooperate mechanically with the connector 20' of the mobile terminal $T_1$.

A special feature of the filter device 30 is that its RF antenna output 16 is identical to the antenna output 15 on the mobile terminal $T_1$. The removable antenna 10 can be removed from the connection 15 and directly connected to the filter device 30. This forms an advantage for mounting the filter device on a mobile terminal $T_1$.

According to one embodiment of the invention, the control connector 20 is located close to the RF connector 21 so as to make mounting of the filter device 21 on the mobile terminal $T_1$ more compact.

According to one embodiment of the invention, the attachment means 22' and 23' are attachment means used for attachment clips of the terminal T1 to a belt. Consequently, the attachment means 22, 23 of the filter device are compatible with these clips.

According to one embodiment, the mechanical design of the filter device 30 is adapted to provide mechanical continuity of the mobile terminal. Furthermore, the filter device 30 may be designed such that the mobile terminal $T_1$ can be held in one hand.

According to one embodiment, the filter device 30 comprises a third channel intended for the reception of a GPS signal. This third channel is connected to the antenna 10 and outputs the received GPS signal to the RF connector 21 to route it towards the mobile terminal $T_1$. The third channel may include a pass band filter or band-stop filter element to process the received signal to optimise the demodulation result and improve the sensitivity of the receiver.

According to one embodiment, the filter device 30 may include a microphone switch type audio accessory. In this case, an ad-hoc interface can be added in the control interface. The audio input/output can then be included in the interfaces of the connector 20 of the filter device 30 to be connected to the connector 20' of the mobile terminal $T_1$.

The invention claimed is:

1. A filter device designed to be connected to a portable mobile terminal compatible with a PMR (Private Mobile Radiocommunications) network with a wide frequency range in reception $B_1$, the filter device comprising an attachment system to attach said filter to an external surface of a body of said mobile terminal, a first radiofrequency connector configured to cooperate with a radiofrequency connector on the mobile terminal, a first channel comprising a first filter to reduce interference in a first useful band $B_{u1}$, at least in reception in band $B_1$, and a second radiofrequency connector configured to cooperate with a removable RF antenna to transmit or receive radiofrequency (RF) signals.

2. The filter device according to claim 1, further comprising a second channel comprising a second filter for reducing interference in a second useful band $B_{u2}$ in reception or in transmission, said second useful band being included within band $B_1$.

3. The filter device according to claim 1, wherein the first filter and/or the second filter is a passband filter for which a template is adapted to one of the useful bands $B_{u1}$ or $B_{u2}$.

4. The filter device according to claim 1, wherein the first filter and/or the second filter is a band-stop filter for a band close to one of the useful bands $B_{u1}$ or $B_{u2}$.

5. The filter device according to claim 1, wherein each channel is used to transmit and receive RF signals from or to the mobile terminal, an active channel in transmission and in reception being selected by the synchronisation signal from the control interface.

6. The filter device according to claim 1, further comprising a power supply interface with the mobile terminal to receive a power supply signal that supplies power to at least one component of said filter device.

7. The filter device according to claim 6, wherein the power supply interface and control interface signals are routed through the same connector of the filter device.

8. The filter device according to claim 1, further comprising a third channel for reception of a GPS signal through the antenna.

9. A mobile terminal, comprising at least two RF connectors, of which a first connector is used to fix an RF antenna to be compatible with a PMR network with a broad frequency band in reception $B_1$ and a second connector configured to cooperate with a connector of a filter device according to claim 1.

10. The mobile terminal according to claim 9, further comprising a first relay mode, the first relay mode defining a first useful band $B_{u1}$ for reception of signals and a second useful band $B_{u2}$ for transmission of signals in band $B_1$, each useful band $B_{u1}$ and $B_{u2}$ being assigned to one of the two channels of the filter device, the mobile terminal configured to send a synchronisation signal to a first and the second switches so as to select the channel corresponding to the current transmission or reception in real time.

11. The mobile terminal according to claim 10, further comprising a second direct mode, the second direct mode defining a third useful band $B_{u3}$ for transmission and reception of RF signals, the third useful band $B_{u3}$ being assigned to one of the two channels of the filter device, the mobile terminal configured to send a synchronisation signal to the first and second switches so as to select the corresponding channel to set up the communication.

12. The mobile terminal according to claim 9, further comprising an accessory connector to output a power supply signal to the filter device.

13. A filter device designed to be connected to a portable mobile terminal compatible with a PMR (Private Mobile Radiocommunications) network with a wide frequency range in reception $B_1$, the filter device comprising:
   an attachment system to attach said filter to an external surface of a body of said mobile terminal;
   a first radiofrequency connector configured to cooperate with a radiofrequency connector on the mobile terminal;
   a first channel comprising a first filter to reduce interference in a first useful band $B_{u1}$, at least in reception in band $B_1$;
   a second radiofrequency connector configured to cooperate with a removable RF antenna to transmit or receive radiofrequency (RF) signals, and
   a control interface configured to cooperate with a connector of the mobile terminal, the control interface configured to output a synchronisation data to activate a set of switches to trigger a changeover from the first channel to the second channel or vice versa.

14. The filter device according to claim 13, wherein the second channel is used to transmit RF signals from the first radiofrequency connector, a selection of each channel of the filter device being controlled by the set of switches, the switches being synchronised by means of the synchronisation signal originating from the control interface.

15. The filter device according to claim 14, wherein the second channel includes a frequency isolator to isolate the second channel from intermodulation products between the transmitted amplified signals and signals received by the filter device.

* * * * *